Sept. 15, 1964   J. D. RICHARD   3,148,618
UNDERWATER SIGNALING APPARATUS
Filed March 20, 1962   2 Sheets-Sheet 1

Sept. 15, 1964   J. D. RICHARD   3,148,618
UNDERWATER SIGNALING APPARATUS
Filed March 20, 1962   2 Sheets-Sheet 2

INVENTOR
Joseph D. Richard 3,148,618
UNDERWATER SIGNALING APPARATUS
Joseph D. Richard, 3569 Loquat Ave., Miami, Fla.
Filed Mar. 20, 1962, Ser. No. 180,991
2 Claims. (Cl. 102—7)

This invention relates to the transmission of acoustic signals in the ocean. More specifically the present invention relates to a method and apparatus whereby the acoustic transmission characteristics of the ocean may be rapidly determined. A method is provided whereby the optimum depth for a signal source may be rapidly determined when it is desired to achieve maximum range in the operation of sonar equipment.

In the past it has been the practice to measure the temperature of the ocean water as a function of depth in order to determine the refracting characteristics of the water as a medium for acoustic transmission. After the vertical temperature profile has been measured, certain computations may be then made in order to predict the sound transmission characteristics. With this knowledge, the optimum operating depths for sound sources and receivers may be determined for the purpose of maximizing sonar detection ranges.

More recently, sound velocity meters have been used for the determination of the vertical velocity profile in the ocean. The direct measurement of acoustic velocity has certain advantages over computations based on temperature and depth information only since the latter technique ignores salinity variations which also affect acoustic velocity. However velocity meters have the disadvantages of high expense and complexity and the data obtained must be processed further before the information may be actually used by the sonar operator.

An outstanding objection to the method used in the past for the determination of optimum depth for acoustic transmission is the complexity of the procedure and the resulting time loss before usable information is obtainable.

An object of the present invention is to provide a system for optimum source depth determination which is devoid of the above mentioned disadvantages and difficulties and which is suitable for use by relatively unskilled persons.

Anothehr object of the present invention is to provide a system for optimum source depth determination which displays the desired information almost immediately in a form which may be utilized without further processing.

The present invention provides an underwater signaling device which, when dropped in the ocean, produces accoustic pulses at various increments of depth. When these acoustic pulses are received at a distance and displayed on a graphic recorder, the optimum source depth can be immediately observed by the relative amplitudes of the various pulses of the sequence.

Other objects and advantages will become more apparent from the study of the following specifications and drawings in which:

FIGURE 1 is an overall diagram which shows the general method of obtaining optimum source depth for acoustic transmission according to my invention. FIGURE 1A shows the receiving system as it would function aboard an aircraft. FIGURE 1B shows the underwater signaling device after it has been dropped from an aircraft. FIGURE 1C shows a conventional sonobuoy which is used to receive the acoustic pulses.

Figure 1:
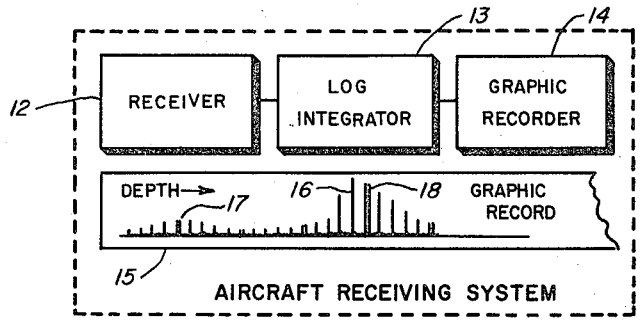
Figure 1:
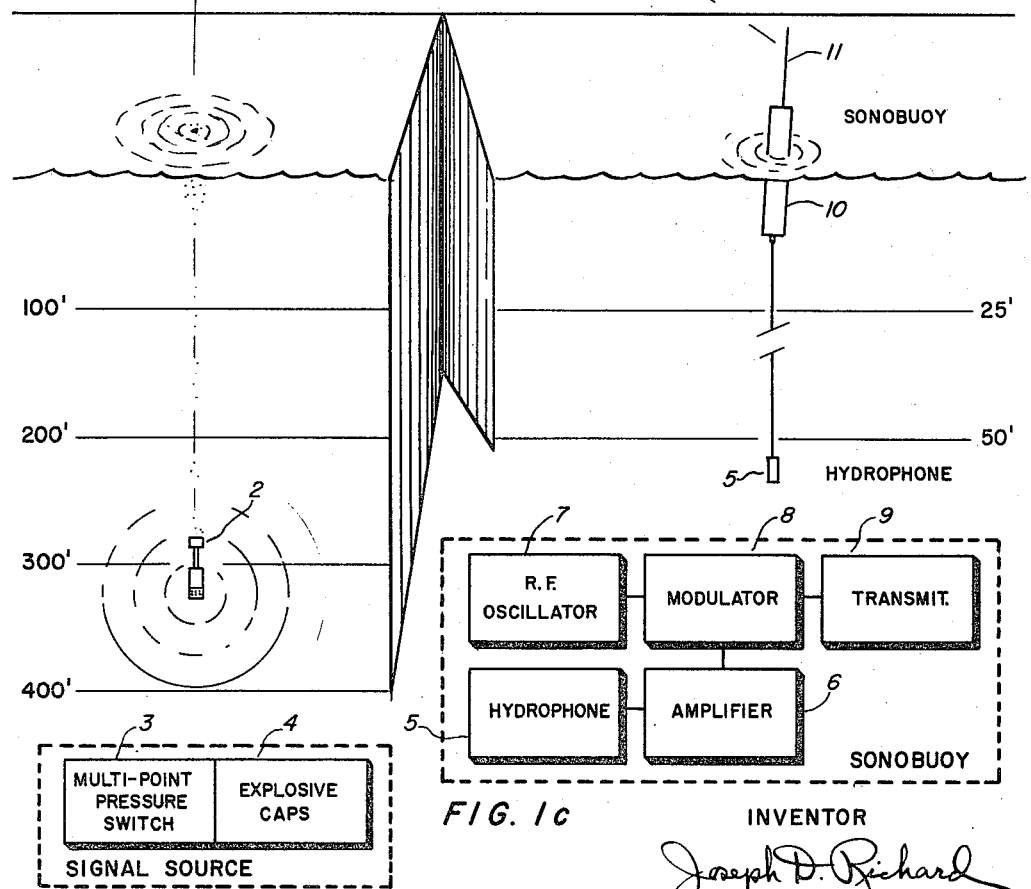

Referring more specifically to FIGURE 1, an aircraft 1 is shown after having dropped the underwater signaling device 2 into the ocean. Acoustic pulses produced at various fixed increments of depth by the underwater signaling device 2 are picked up by the hydrophone 5 which is a component of the standard sonobuoy 10. The sonobuoy 10 transmits by radio to the aircraft 1 electromagnetic signals which have the same temporal spacing and relative amplitude as the acoustic signals received by the hydrophone 5.

FIGURE 1A shows the receiving system in the aircraft 1. Radio signals from the sonobuoy 10 are detected by the receiver 12. The demodulated signals are integrated by the log integrator 13 and are then fed into the graphic recorder 14. The graphic record 15 shows a sequence of pulses which have been received from the sonobuoy 10.

FIGURE 1B shows the functional components of the underwater signaling device 2 in which the multi-point pressure switch 3 is used detonate the explosive caps 4 at various fixed increments of depth.

FIGURE 1C shows schematically the various components of the standard sonobuoy 10 in which the hydrophone 5 picks up acoustic signals from the water. The resulting electrical signals are amplified by the amplifier 6 which are then used to modulate the radio frequency signals from the oscillator 7 by means of the modulator circuit 8. The modulated R.F. signals are then transmitted by the transmitting stage 9.

The aircraft receiving system of FIGURE 1A and the sonobuoy of FIGURE 1C represent, schematically, equipments which are already in use for detection of submarines by aircraft. It is intended that the underwater signaling device of the present invention be usable with these already existing systems virtually without alterations of any kind. It should also be pointed out that this underwater signaling system is also compatable with sonar receiving systems used on surface ships. It is only necessary that the signaling system be dropped in the water a considerable distance from the surface ship.

Figure 2:
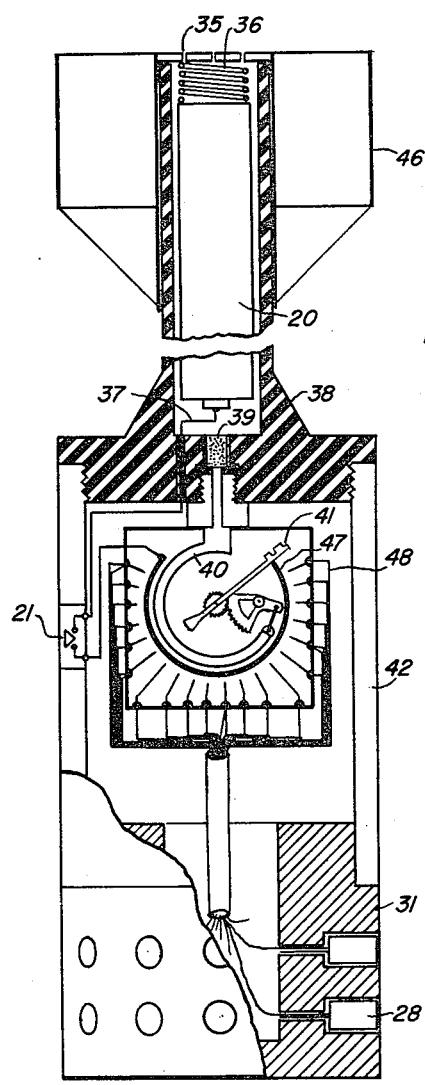
FIGURE 2 shows a sectional view of the underwater signaling device.
Figure 5:
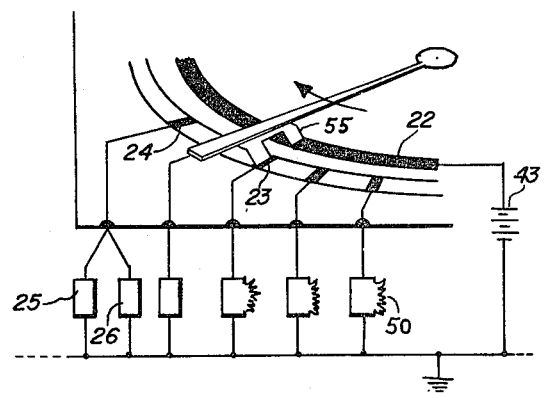
FIGURE 5 shows the contacts of the multi-point pressure switch which is used to detonate the explosive caps at various fixed increments of depth.

FIGURE 2 shows the underwater signaling apparatus according to the present invention. A cylindrical housing 42 contains a multi-point pressure switch in which the Bourdon tube 40 drives the shorting contacts 41 across the various contacts, such as the contact 48, in response to increasing hydrostatic pressure as the housing sinks in the water. The various contacts, typified by the contact 48, are spaced to correspond to known increments of pressure which are selected so that the detonations occur at predetermined increments of depth. Assuming the contacts of the multi-point pressure switch are spaced for increments of twenty feet of depth and the first cap is detonated at a depth of twenty feet, the third contact of the switch would be connected to the ignition current from the battery 20 through the shorting contacts 41 from the conducting ring 47 when the hydrostatic pressure of sixty feet of water is sensed by deflection of the Bourdon tube 40. When this occurs the explosive cap 28 is detonated. Provisions are made so that the major increments of depth are indicated by a double detonation which is accomplished by the simultaneous switching of one instantaneous explosive cap and one delayed explosive cap as shown in FIGURE 5. The explosive caps, such as the explosive cap 28, are shown radially mounted within the nosepiece 31. One of the leads of each explosive cap is shorted to the metal nosepiece 31 and the second lead of each explosive cap is connected to a separate contact of the multi-point pressure switch. In addition, the switch contacts which represent major increments of depth also have a delayed explosive cap connected to them. That is, each fifth contact, representing one hundred foot increments of depth, has one instantaneous cap and one delayed cap connected to it. Although these two caps are switched simultaneously, there is actually a delay between the two explosions, for example 0.1 second. Delayed explosive caps are readily available commercially with any desired delay period between a few milliseconds and several seconds. When these sequential series of pulses are received and displayed on a graphic recorder, the major depth increments are immediately identifiable by the double pulses. By using the first and last pulses as additional reference points, the depth represented by any of the pulses of the sequence may be immediately recognized. An elongated tail section 38 of plastic is shown which contains the battery 20. The battery 20 is shown as a salt water activated battery with its negative terminal connected to the metal tail fin 46 through the contact spring 36. The holes 35 allow salt water to activate the battery 20 when the entire device is dropped into the ocean. Because salt water is an excellent conductor, the negative side of the battery 20 is connected to the metal nosepiece 31 (and therefore to the grounded side of all of the explosive caps) when the entire device is immersed in the ocean. The salt water path between the metal fin 46 and the metal nosepiece 31 serves as a switch which is open until the unit is dropped into the water. This serves as a safety feature for the prevention of accidental detonations. The positive side of the battery 20 is connected to the arming pin switch 21 through the wire 37. The arming pin switch 21 is closed before the unit is dropped into the water. The positive side of the battery is then connected to the contact ring 47. Hydrostatic pressure is allowed to deflect the Bourdon tube 40 by the diffusion of water through the porous plug 39. The porous plug 39 damps out transient high pressures produced by the detonating caps while at the same time allowing the hydrostatic pressure to have full effect on the Bourdon tube 40. Deflections of the Bourdon tube 40 cause the shorting contacts 41 to bridge the spaces between the ring conductor 47 and the individual contacts, such as 48, as the various increments of pressure are encountered.

Figure 3:
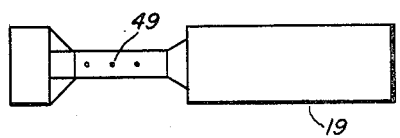
FIGURE 3 shows the overall relative dimensions and external appearance of the underwater signaling device.

FIGURE 3 shows the overall appearance of the underwater signaling device 19. The holes 49 in the tail section facilitate the activation of the sea water battery when the unit is dropped into the water.

Figure 4:
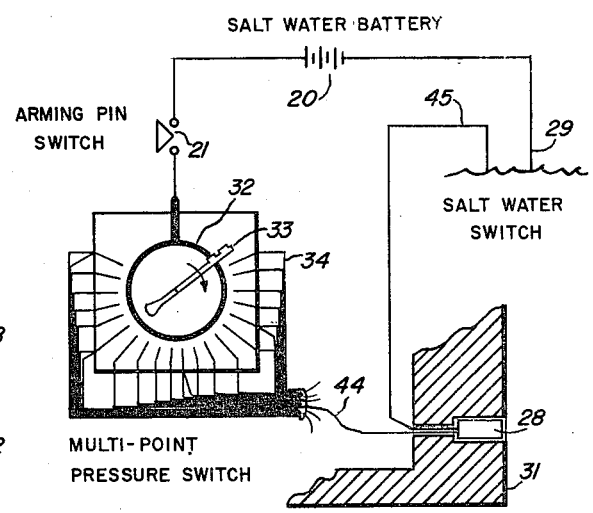
FIGURE 4 shows the electrical circuit for producing acoustic pulses at various fixed increments of depth.

FIGURE 4 shows the electrical circuit including the arming pin switch 21, the salt water battery 20, the salt water switch between metal surfaces 29 and 45, a typical explosive cap 28 mounted in a section of the nosepiece 31, and the multi-point pressure switch consisting of the conducting ring 32, the shorting contacts 33 and the typical individual contact 34. The Bourdon portion of the pressure switch is not shown.

FIGURE 5 shows the multi-point pressure switch contacts in greater detail. The arm on which is mounted the shorting contacts 55 is driven by some pressure deflected member (not shown) in the direction of the arrow. The positive side of the battery 43 is connected to the conducting ring 22. The explosive cap 50 has already been fired as have two other caps. In the position shown, the shorting contacts 55 are bridging the conducting ring 22 to the individual contact 23. The contact 24, which is to be switched at the next major increment of depth, is shown with one instantaneous explosive cap 25 and one delayed explosive cap 26 connected to its terminal. The delayed explosive cap 26 has been selected so that it will detonate 0.1 second after the instantaneous explosive cap 25 has detonated.

Figure 6:
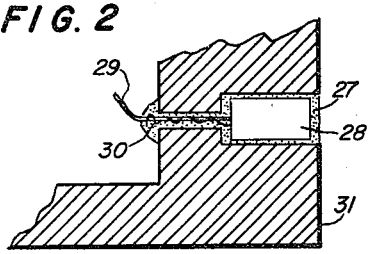

FIGURE 6 shows a section of the nosepiece 31 of the underwater signaling device. A typical explosive cap 28 is shown imbedded in a conductive plastic compound 27 within the nosepiece. One lead 29 from the explosive cap 28 is well insulated along its entire length and this lead goes to a suitable contact of the aforementioned pressure switch. The bare lead 30 from the explosive cap 28 is well grounded to the metal nosepiece 31 through the conductive plastic 27.

It will be seen therefore that I have provided an underwater signaling method and device which readily yields information on the depth at which an acoustic source should be activated in order to achieve maximum transmission range in the ocean.

I have specifically described a system which is directly usable with existing airborne submarine detection systems. One method of submarine detecting by aircraft involves the dropping of sonobuoys in the water, dropping an explosive charge near the sonobuoys, and then recording subsequent echoes as picked up by the sonobuoy hydrophones by means of a radio link between the sonobuoy and the aircraft. The present invention is intended to be used with the above described explosive echo ranging system. The underwater signaling device may be dropped in the water a considerable distance from the sonobuoys and the relative amplitude of the pulse sequence, as recorded on the graphic recorder in the plane, immediately shows the depth at which the large explosive charge should be set to detonate in order to achieve maximum detection range.

The present invention is not intended to be limited to use by aircraft engaged in explosive echo ranging. For example, the same device is equally applicable to use with helicopters engaged in dipped sonar echo ranging. In this latter case the information would be useful in determining the optimum depth to which the transducer should be lowered. For any given transducer depth, the information obtained would show the depths at which submarines would be most efficiently detected.

The device of the present invention may also be used with surface ships. If the ship is equiped with variable depth sonar, the information obtained by the use of the presently described underwater signaling device would indicate the depth to which the transducer should be lowered in order to achieve maximum range. If the surface ship has fixed depth sonar, the information obtained by the use of the present signaling device would show immediately the depths at which submarines would be most efficiently detected. The expected detection range for the sonar under the existing environmental conditions could also be estimated by a consideration of the relative amplitudes of the various pulses of the sequence. In fact a very convenient classification system for varius transmission characteristics could be evolved based on this kind of information alone assuming that the underwater signaling device is dropped into the water a sufficient distance from the receiving ship.

The acoustic pulses herein described are produced by the electric detonation of an explosive cap. This is a very efficient acoustic pulse source when using sonar equipments already designed for low frequency or explosive pulse reception. However, when using higher frequency sonar equipments it might be desirable to use a fixed frequency pulse source in the underwater signaling device which is set at the exact frequency of the sonar equipment with which it is to be used.

Widely varying depth ranges are of interest depending on the specific type of sonar being used. Signaling apparatus for two depth ranges should cover almost all applications. For example these might be 0–400 feet and 0–4000 feet. For some uses a third depth range of 0–200 feet might be desirable. Examples of the depth firing sequences would be as follows:

| Depth Range | Single Pulse | Double Pulse |
| --- | --- | --- |
| 0–200 feet | Every 10 feet | Every 50 feet. |
| 0–400 feet | Every 20 feet | Every 100 feet. |
| 0–4,000 feet | Every 200 feet | Every 1,000 feet. |

It may be seen that about twenty-four explosive caps would be required for any one of the above suggested signaling systems. Obviously finer detail could be achieved in any of the depth ranges by making available a larger number of explosive caps and tapping off intermediate points on the multi-point pressure switch. It is also obvious that a more complex detonation sequence could be used to indicate some desired specific depth. For example, the end of a particular depth range could be indicated by the sequential denoation of three caps (such as three shots at a depth of 4000 feet).

An electric explosive cap is a device which transforms electrical energy into heat which in turn ignites an expolsive charge. These caps are commercially available in a wide variety of charge sizes. Delay electric explosive caps are made by putting a delay element with a very closely controlled burning time between the ignition element and the primer charge which in turn detonates the base charge of the cap. When a delay cap is in the same circuit with a normal (instantaneous) cap they will receive electric current simultaneously and their ignition elements will flash at the same time, but the base charge of the delayed cap will not detonate until the delay element has burned through. The actual time of detonation will then differ by the burning time of the delay train of the delay cap. A delay time of 0.1 second has been found convenient for the extra cap used to mark the major increments of depth in the presently described signaling system.

The graphic record 15 shown in FIGURE 1A shows how the relative amplitude of the various pulses of the sequence might appear as the depth of the signaling source increases. Here single pulses are shown for every twenty feet of depth and double pulses (one normal and one delayed) are shown for each one hundred feet of depth. Note the first one hundred foot mark 17 and the fourth hundred foot mark 18. It may be seen that the pulse of greatest amplitude 16 was from a depth of 380 feet. The optimum depth for signal sources may be determined by inspection of the graphic record 15 and it appears to be around the 380 foot depth.

Although a sea water activated battery has been described in the above specifications it should be obvious that any type of battery could be used. The porous plug 39 of FIGURE 2 is intended to damp out transient high pressures caused by the detonations of the explosive caps.

In conclusion, while I have described particular embodiments of my invention for purposes of illustration, it will be understood that various modifications and adaptations thereof may be suggested to those skilled in the art without departing from the spirit and scope of the invention as defined in the following claims.

What is claimed is:

1. Expendable apparatus for determining the relative transmission characteristics of a series of explosive pulses detonated at predetermined depths in the ocean comprising: a negatively buoyant housing suitable for dropping into the ocean from an aircraft; a multi-contact pressure driven switch within the said housing, the various contacts of which are sequentially closed in response to continually increasing hydrostatic pressure outside the said housing as it sinks into the ocean, the said various contacts being so spaced and arranged as to be closed at predetermined fixed intervals of depth, each contact of the said switch thereby being closed at some predetermined minor interval of depth and certain periodically spaced contacts being closed at predetermined major intervals of depth; a first series of electrically detonated explosive charges mounted within the said housing and ventable to the surrounding water, one charge of the said first series of explosive charges being connected to each of the said contacts of the said multi-contact switch, the said first series of explosive charges having a substantially instantaneous detonation characteristic when activated by electrical current; a second series of electrically detonated explosive charges mounted within the said housing and ventable to the surrounding water, one charge of the said second series of explosive charges being connected to each of the said periodically spaced contacts which are closed at predetermined major intervals of depth, the said second series of explosive charges having a delayed detonation characteristic when activated by electrical current; a battery connected to the wiper arm of the said multi-contact pressure driven switch, one charge of the said first series of explosive charges being thereby detonated at each minor and major interval of depth and one charge of the said second series of explosive charges being thereby detonated at each major interval of depth as the said housing sinks in the ocean, the relative amplitudes of the resulting series of pulses being determinable, and the major depth intervals being recognizable by a double pulse, when received at some point in the ocean substantially remote from the said vertically sinking housing.

2. Expendable apparatus for determining the relative transmission characteristics of a series of explosive pulses detonated at predetermined depths in the ocean comprising: a negatively buoyant housing suitable for dropping into the ocean from an aircraft, the said housing being watertight and resistant to pressure; a multi-contact pressure driven switch within the said housing, the various contacts of which are sequentially closed in response to continually increasing hydrostatic pressure outside the said housing as it sinks into the ocean, the said various contacts being so spaced and arranged as to be closed at predetermined fixed intervals of depth, each contact of the said switch thereby being closed at some predetermined minor interval of depth and certain periodically spaced contacts being closed at predetermined major intervals of depth; a first series of electrically detonated explosive charges mounted within the said housing and ventable to the surounding water, one charge of the said first series of explosive charges being connected to each of the said contacts of the said multi-contact switch, the said first series of explosive charges having a substantially instantaneous detonation characteristic when activated by electrical current; a second series of electrically detonated explosive charges mounted within the said housing and ventable to the surrounding water, one charge of the said second series of explosive charges being connected to each of the said periodically spaced contacts which are closed at predetermined major intervals of depth, the said second series of explosive charges having a delayed detonation characteristic when activated by electrical current; a battery; a pair of open electrical contacts in series with a lead from the said battery, the said contacts being bridgeable by the immersion of the said housing in sea water; means connecting the wiper arm of the said multi-contact pressure driven switch to a lead from the said battery, one charge of the said first series of explosive charges being thereby detonated at each minor and major interval of depth and one charge of the said second series of explosive charges being thereby detonated at each major interval of depth as the said housing sinks in the ocean, the relative amplitudes of the resulting series of pulses being determinable, and the major depth intervals being recognizable by a double pulse, when received at some point in the ocean substantially remote from the said vertically sinking housing.

References Cited in the file of this patent

UNITED STATES PATENTS

| | | |
|---|---|---|
| 2,520,814 | Rule | Aug. 29, 1950 |
| 2,750,794 | Downs | June 19, 1956 |
| 2,859,695 | Rolle | Nov. 11, 1958 |
| 2,967,481 | Semon et al. | Jan. 10, 1961 |
| 3,098,993 | Coop | July 23, 1963 |